United States Patent [19]
Felsen

[11] 3,888,464
[45] June 10, 1975

[54] INDEPENDENT JACKING SYSTEM FOR VEHICLES AND THE LIKE

[76] Inventor: Karl H. Felsen, 47 Matinee Bay, Winnipeg, Manitoba, Canada

[22] Filed: May 7, 1974

[21] Appl. No.: 467,661

[30] Foreign Application Priority Data
June 26, 1973 Canada .................. 174930

[52] U.S. Cl. .................. 254/86 R; 254/103
[51] Int. Cl. .................. B66f 3/18
[58] Field of Search .............. 254/86 R, 45, 98, 103; 280/150.5

[56] References Cited
UNITED STATES PATENTS

| | | | |
|---|---|---|---|
| 3,182,956 | 5/1965 | Dalton | 254/86 R |
| 3,442,531 | 5/1969 | Rutledge | 254/86 R |
| 3,523,698 | 8/1970 | Bishop | 254/86 R |
| 3,738,613 | 6/1973 | Hollis | 254/86 R |
| 3,790,133 | 2/1974 | Jones | 254/86 R |

Primary Examiner—Al Lawrence Smith
Assistant Examiner—Robert C. Watson
Attorney, Agent, or Firm—Stanley G. Ade

[57] ABSTRACT

A reversible electric motor and screw type jack assembly is secured to the vehicle frame adjacent each wheel and can be actuated separately or cojointly from a control box which can be fixed or can be moved to a position externally of the vehicle. Each screw type jack assembly includes a reduction gear and an elongated screw having a nut engaged therearound. A worm drive from the reduction gear engages the nut and as the screw is prevented from rotation, the screw extends or retracts from the housing which is secured to the frame member of the vehicle. A limit switch assembly is provided and the device is designed so that the motor and the switch assembly are interchangeable so that the device can be assembled for use on the right or left side of the vehicle.

8 Claims, 8 Drawing Figures

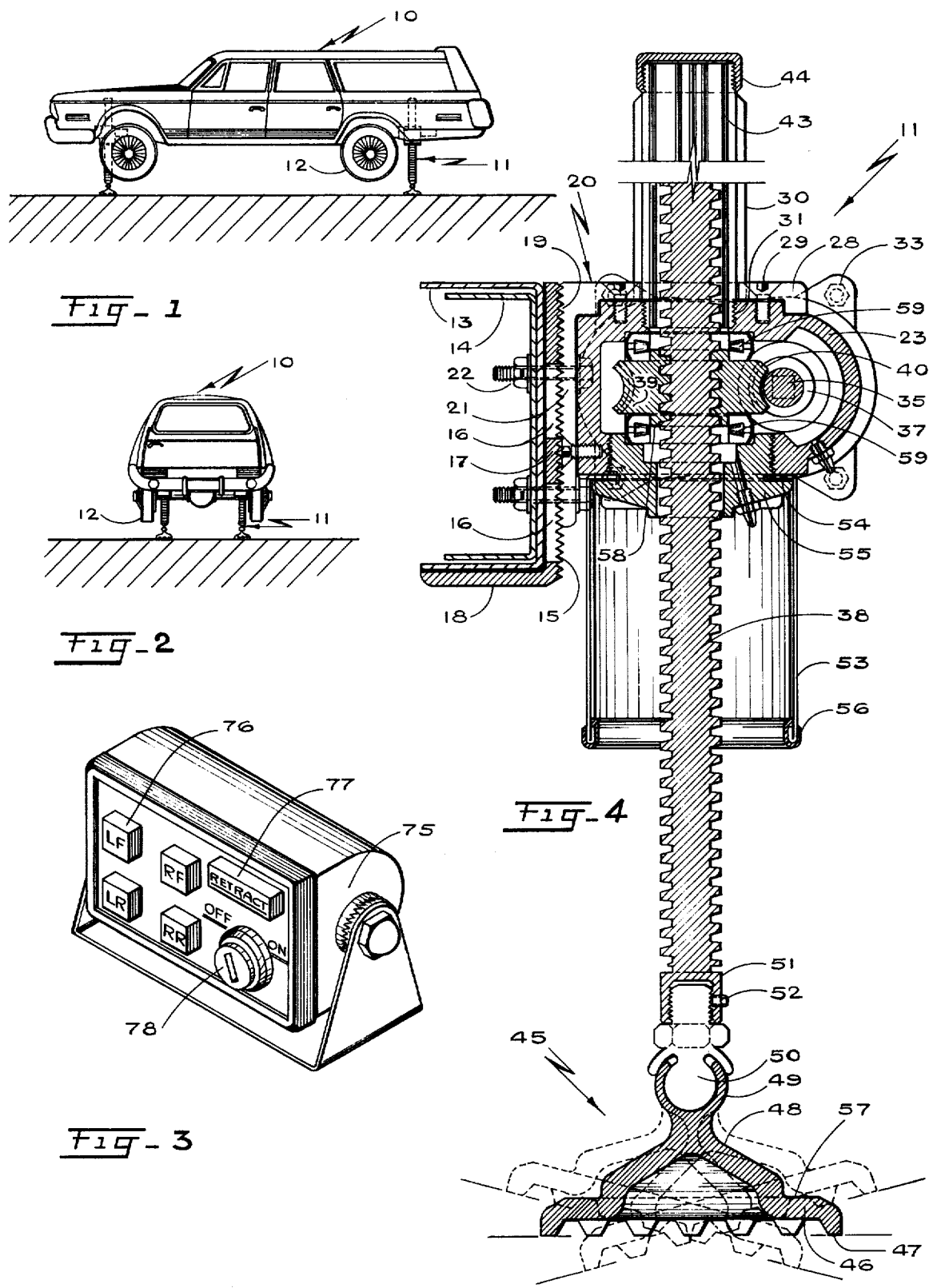

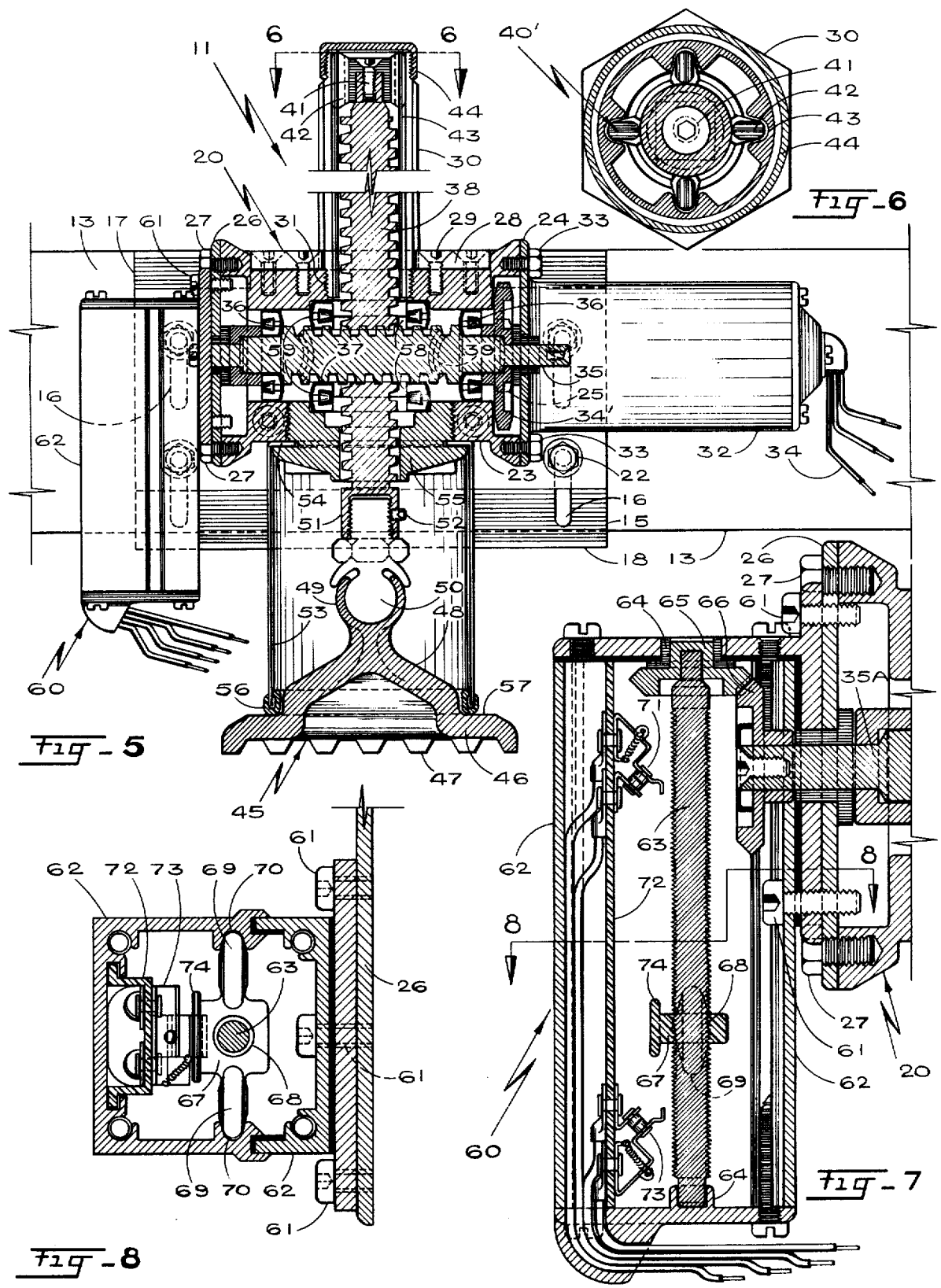

3,888,464

INDEPENDENT JACKING SYSTEM FOR VEHICLES AND THE LIKE

BACKGROUND OF THE INVENTION

This invention relates to new and useful improvements in jacking systems for vehicles and although it is designed primarily for use with automobiles, nevertheless it will be appreciated that it can be used with any vehicle or the like which is wheel mounted and in which it is desirable at times to elevate one or more of the wheels from the ground for service or inspection purposes.

Conventionally, a vehicle is supplied with a separate jack which is engaged at the adjacent corner or side of the vehicle whereupon the side or corner is elevated until the wheel is clear of the ground thus enabling the wheel to be changed, maintenance to be undertaken or inspection to be instituted.

If the vehicle is at a service station or the like, it will of course be appreciated that the conventional hoist can be used, but it is often not convenient to take a vehicle to the service station for this purpose.

Furthermore, it is often necessary to elevate one or more wheels of the vehicle for repair or inspection purposes at locations remote from hoists and the like.

Conventional jacks supplied by vehicles are unsafe and are difficult to use and, except in some vehicles, only one wheel at a time may be elevated. Other vehicles, particularly foreign vehicles, have a side jacking location which enables one side of the vehicle to be elevated but all of these jacking systems are unsafe and are awkward and difficult to use, particularly if the surface upon which the vehicle is supported, is not level and firm.

Attempts have been made in the past to provide an independent jacking system for vehicles, but these suffer from many disadvantages, the principal one of which is the fact that they are often mounted on the axles rather than the frame which forces the wheel into the wheel wells and thus defeats the purposes and advantages of independent jacking systems applicable for today's vehicles.

Furthermore, such systems are not particularly well protected so that dirt, dust and other foreign matter can easily enter the mechanism causing same to operate ineffectively or not at all.

Furthermore, it is essential that the devices are prevented from the ingress of water so that they can operate below freezing temperatures often encountered in this country.

SUMMARY OF THE INVENTION

The present invention overcomes these disadvantages by providing an electrically operated independently mounted screw jack at each corner of the frame adjacent the wheels, which is completely sealed against the ingress of moisture, dirt and the like.

Another object of the invention is to provide a device of the character herewithin described in which any one of the jacks can be operated either separately or, alternatively, they can be operated concurrently.

A still further object of the invention is to provide a device of the character herewithin described which is mounted to the frame of the vehicle thus enabling the frame and body only to be elevated while the drive train rear axle, rear and front suspension and wheels drop to a relaxed state until finally suspended a few inches above ground level.

Still another object of the invention is to provide a device of the character herewithin described in which the jacking shoes are universally mounted so that they will adjust to unevenness of terrain.

A still further object of the invention is to provide a device of the character herewithin described in which the jacks may be operated from a control box within the car or, alternatively, which includes means whereby this control box can be connected remotely so that the operator can stand clear of the car or vehicle while it is being elevated.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DETAILS OF THE FIGURES

FIG. 1 is a side elevation of a vehicle shown in the elevated position.

FIG. 2 is a rear view of FIG. 1.

FIG. 3 is an isometric view of one embodiment of the control box.

FIG. 4 is an enlarged cross sectional view of one of the jacks shown attached to the frame and shown in the partially extended position.

FIG. 5 is a view at right angles to FIG. 4, but showing the jack in the fully retracted position.

FIG. 6 is an enlarged cross sectional view substantially along the line 6—6 of FIG. 5.

FIG. 7 is an enlarged sectional view of the limit switch assembly.

FIG. 8 is a cross sectional view substantially along the line 8—8 of FIG. 7.

In the drawings like characters of reference indicate corresponding parts in the different figures.

DETAILED DESCRIPTION

Proceeding therefore to describe the invention in detail, reference character 10 shows a vehicle being provided with one of the jacking devices collectively designated 11, adjacent each corner thereof and adjacent the wheels 12.

The vehicle includes a longitudinally extending chassis frame member 13 which is usually of channel configuration and the jacking devices are secured to the longitudinal frame members 13 as clearly shown in FIG. 4.

A relatively short length of channel 14 acts as a stiffener for the frame member 13 at the location of the jacking devices 11 and an adjustable frame mounting bracket 15 is provided with vertically extending slots 16 in the vertical web 17 thereof for limited vertical adjustment relative to the frame 13. This member 15 includes a base flange 18 as clearly shown.

The outer surface of the main web or flange 17 is serrated as at 19 to receive a gear box enclosure collectively designated 20 having one side 21 correspondingly serrated to engage the serrations 19 as clearly shown.

Nut and bolt assemblies 22 extend through the reinforcing member 14, through the channel frame 13, through the bracket 15 and thence through the side 21 of the gear box enclosure mounting bracket, the ends of which extend beyond the enclosure housing to permit the clamping of the enclosure to the frame.

The gear box enclosure includes a main body 23 having a first end plate 24 which is an integral part of an interchangeable direct current electric reversible motor 32 secured to one end of the body by means of bolts 33.

A similar enclosure plate 26 is secured to the other end of the main body by means of bolts 27 and these two enclosure plates are similar in configuration.

A hexagonal tubular screw enclosure 30 threadably engages the top portion of the gear box enclosure 20 (main body) as indicated by reference character 31.

A top plate 28 (gear box enclosure mounting bracket) with a corresponding hexagonal clearance hole is placed over the hexagonal tubular screw enclosure 30 and is secured to the upper and left hand side of the gear box enclosure 20 (main body) with countersunk machine screws 29 as clearly shown on FIG. 4 thus preventing disengagement (unthreading) of the screw enclosure 30.

The direct current reversible electric motor 32 complete with integral end plate 24 is secured by means of bolts 33 and is connected to a source of electrical energy such as a storage battery (not illustrated), by means of cable 34. The electric motor drives a relatively small gear 25 which in turn engages with a relatively large gear 34' which constitutes part of a reduction gear and this large gear is keyed to one end of a worn gear shaft 35 journalled within bearing races 36 situated within the main gear box body enclosure and a worm gear 37 is formed on this shaft in the usual manner.

A main jack screw 38 extends vertically through the gear box enclosure with the upper end extending into the hexagonal tube 30 and a gear nut 39 screw threadably engages the jack screw 38 and is provided with external gear teeth 40 engageable with the worm gear 37 all of which is relatively conventional construction.

From the foregoing it will be appreciated that rotation of the electric motor 32 will rotate the worm gear 37 through the reduction gear 34 and this in turn will rotate the nut 39 so that if the jack screw 38 is prevented from rotating, then the jack screw will retract and extend relative to the gear box enclosure depending upon the direction of rotation of the electric motor 32.

Means are provided to prevent rotation of the jack screw 38 and take the form of a jack screw guide stabilizer collectively designated 40'. This stabilizer is secured to the upper end of the jack screw 38 by means of countersunk machine screw 41 and is provided with a plurality of projecting vertically situated splines 42 which slidably engage within grooves 43 formed on the inner surface of the screw enclosure tube 30. This prevents the rotation of the jack screw 38 yet permits same to retract and extend as the stabilizer slides up and down the tube 30 with the movement of the jack screw 38. A cap 44 screw threadably engages the upper end of the tube 30 and seals same from the ingress of moisture, dirt and the like.

A jack shoe assembly collectively designated 45 is provided at the lower end of the jack screw 38 and consists of a substantially circular plate 46 having downwardly extending teeth 47 to facilitate the gripping of the surface upon which the device is used. This plate is provided with an upper portion 48 having a substantially spherical cup 49 formed concentrically thereon which engages around a ball 50 thus providing a limited universal attachment for the shoe 45. This ball screw threadably engages within the lower end 51 of the jack screw and is held by means of locking set screw 52.

A lower end screw enclousre 53 is provided and takes the form of an open-ended tube having an inturned flange 54 at the upper end thereof which is engaged by a lower gear box enclosure cap 55 which screw threadably engages within the underside of the gear box enclosure.

An annularly situated plastic seal 56 is secured to the lower end of the tube 53 and this seal is engaged by the upper side 57 of the circular plate 46 when the jack screw 38 is in the fully retracted position shown in FIG. 5 thus effectively sealing off the mechanism from dirt, dust, moisture and the like.

Means are provided to give support to the jack screw and is incorporated with the aforementioned nut 39 which is shouldered top and bottom as illustrated by reference character 58 and these shoulders are supported within annular ball or bearing races 59 mounted within the gear box casing.

Further support on the jack screw 38 is achieved with the jack screw guide stabilizer 40' which slidably engages within grooves 43 on the inner surface of the screw enclosure tube 30.

A limit switch assembly collectively designated 60 is situated on the side of the gear box enclosure opposite to the electric motor 32 and is mounted to the end plate 26 by means of machine screws 61 and FIGS. 7 and 8 show details of this limit switch assembly which includes a casing 62 having a limit switch screw shaft 63 situated vertically within the casing and being journalled at the upper and lower ends of the casing as indicated by reference character 64.

A bevel gear 65 is secured to the upper end of the shaft 63 and is supported for rotation within the means 64 of the upper end of the casing and a corresponding bevel gear 66 is secured to the other end 35A of the worm gear shaft 35 so that rotation of the worm gear shaft will cause the screw shaft 63 to rotate.

A limit switch actuator 67 takes the form of an internally screw threaded nut 68 engageable with the screw shaft 63 and this actuator is prevented from rotating by the provision of a pair of opposing plastic travel bars 69 extending from each side of the nut 68 and engageable within vertically situated grooves 70 formed on the interior walls of casing 62 as clearly shown in FIG. 8.

An upper limit switch 71 is secured to a bracket 72 within the casing 62 and similarly, a lower limit switch 73 is secured at the lower end of the bracket 72 and these limit switches are operatively connected between the source of electrical energy and the electric motor 32.

However, as the wiring of such devices is well known to those skilled in the art, we do not believe it necessary to explain same further.

The actuator 67 includes a member 74 which, when it is towards the upper end of its travel on screw 63, actuates upper limit switch 71 breaking the circuit and thus disconnecting the source of power from the motor 32 and stopping the mechanism.

By the same token, when the actuator 67 is adjacent the lower end of its travel upon screw 63, it operates limit switch 73 again breaking the electrical circuit and thus stopping the mechanism.

The gears 65 and 66 together with the pitch of the screw 63 is such that the upper and lower limit switches 71 and 73 are actuated when the main jack screw is at the upper and lower ends of its travel, the lower end being when the shaft is fully extended and the upper end when it is fully retracted as shown in FIG. 5.

It is desirable that the screw jack devices be operated from the common control panel one embodiment of which is shown in FIG. 3.

It is wired to the individual jacks and to the source of electrical energy and is preferably provided with an on-off key switch 78 shown in the front of the casing 75.

The individual buttons 76 operate the individual jacks on the vehicle and normally extend the jacks fully as the buttons are pressed.

Since the buttons are of the spring loaded-touch-sensitive type, various stages of extension of individual jacks can be achieved, if so desired. To retract the jacks, the retract button 77 is actuated. This button is also of the spring loaded-touch-sensitive type and is commonly interconnected to the limit switches via relays of all jacks. Thus, when pressed, any one or all jacks which are extended will start to retract.

The control panel assembly 75 may be mounted within the vehicle at any convenient location. Alternatively, it may be provided with an extension cord on a reel (not illustrated) which will enable the control panel to be operated externally of the vehicle so that the operator can watch or control the elevation of one or more of the wheels of the vehicle. By the same token, it will also be appreciated that a plug-in extension cable can be utilized rather than an extension reel. As all of these expedients are conventional, it is not believed necessary to explain same further.

From the foregoing it will be appreciated that independent jacking means are provided adjacent each wheel of a vehicle which may be operated either separately or together and which are adapted to elevate the frame of the vehicle rather than to operate directly upon the axles thereof.

Furthermore, the enclosure is fully sealed against the ingress of moisture, dust or dirt thus assisting in the maintenance of the device in operating condition regardless of the external influences and temperatures.

Finally, note should be made of the fact that the electric motor 32 and the limit switch assembly 60 can be interchanged with the end plates 24 and 26 so that it is only necessary to design one enclosure and assembly. This enables right and left handed devices to be manufactured which facilitates mounting of the devices upon the vehicle chassis.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A jacking device for vehicles and the like which include a longitudinally extending frame member and a source of electrical energy; comprising in combination means to secure said device to the frame member, a gear box enclosure secured to said means, a reversible electric motor secured to one side of said enclosure and being selectively connectable to said source of electrical energy, an elongated jack screw extending vertically through said gear box, means to support said screw for vertical extending and retracting movement relative to said gear box, means to inhibit rotation of said jack screw within said gear box, a jack shoe on the lower end of said jack screw, and worm and nut drive means within said gear box operatively connected between jack screw and said electric motor, a synchronized limit switch assembly secured to the other side of said gear box for disconnecting said electric motor from said source of electrical energy at the upper and lower limits of travel of said jack screw, said worm and nut drive means including a worm gear, a worm gear shaft journalled for rotation within said gear box and a nut screw threadably engaging around said jack screw and being engaged by said worm gear, said nut including bearing support means within said gear box, and constituting said means for supporting said jack screw, said limit switch assembly including a casing, a limit switch screw shaft journalled for rotation within said casing, gear means connecting said worm gear shaft with said limit switch screw shaft, a non-rotatable nut engaged around said limit switch screw shaft for travel therealong when said shaft is rotated, and upper and lower limit switches in said casing operated by said last mentioned nut when said nut is at the upper and lower limits of travel upon said limit switch screw shaft, said limit switches being operatively connected between said source of electrical energy and said electric motor.

2. The device according to claim 1 which includes a reduction gear assembly in said gear box, said reduction gear assembly including a first gear driven by said electric motor and a second gear driven by said first gear, said second gear being detachably secured to one end of said worm gear shaft, said limit switch assembly being operatively connected to the other end of said worm gear shaft, said electric motor and said reduction gear assembly being interchangeable with said limit switch assembly.

3. The device according to claim 1 which includes a screw enclosure extending upwardly from said gear box, said means to inhibit rotation of said jack screw being situated within said screw enclosure, said jack shoe being mounted for limited universal movement upon the lower end of said jack screw, and a lower end enclosure secured to and extending downwardly from said gear box and receiving the said lower end of said jack screw, the upper side of said jack shoe and the universal connection therebetween when said jack screw is in the fully retracted position, and means on the lower end of said lower end enclosure co-operating with said jack shoe to seal off said lower end enclosure and protect the parts therein from dust, moisture and the like.

4. The device according to claim 2 which includes a screw enclosure extending upwardly from said gear box, said means to inhibit rotation of said jack screw being situated within said screw enclosure, said jack shoe being mounted for limited universal movement upon the lower end of said jack screw, and a lower end enclosure secured to and extending downwardly from said gear box and receiving the said lower end of said jack screw, the upper side of said jack shoe and the universal connection therebetween when said jack screw is in the fully retracted position, and means on the lower end of said lower end enclosure co-operating with said jack shoe to seal off said lower end enclosure and protect the parts therein from dust, moisture and the like.

5. The device according to claim 1 in which said means to inhibit rotation of said jack screw includes a jack screw guide stabilizer within said screw enclosure, said stabilizer being secured to the upper end of said jack screw, and means co-operating between said stabilizer and said enclosure whereby said stabilizer moves up and down said enclosure as said jack screw retracts and extends in a non-rotatable relationship with said tube.

6. The device according to claim 2 in which said means to inhibit rotation of said jack screw includes a jack screw guide stabilizer within said screw enclosure, said stabilizer being secured to the upper end of said jack screw, and means co-operating between said stabilizer and said enclosure whereby said stabilizer moves up and down said enclosure as said jack screw retracts and extends in a non-rotatable relationship with said tube.

7. The device according to claim 3 in which said means to inhibit rotation of said jack screw includes a jack screw guide stabilizer within said screw enclosure, said stabilizer being secured to the upper end of said jack screw, and means co-operating between said stabilizer and said enclosure whereby said stabilizer moves up and down said enclosure as said jack screw retracts and extends in a non-rotatable relationship with said tube.

8. The device according to claim 4 in which said means to inhibit rotation of said jack screw includes a jack screw guide stabilizer within said screw enclosure, said stabilizer being secured to the upper end of said jack screw, and means co-operating between said stabilizer and said enclosure whereby said stabilizer moves up and down said enclosure as said jack screw retracts and extends in a non-rotatable relationship with said tube.

* * * * *